US012567754B2

(12) United States Patent
Fuchs et al.

(10) Patent No.: US 12,567,754 B2
(45) Date of Patent: Mar. 3, 2026

(54) MULTI-PORT CHARGER AND BATTERY PACK MULTI-PORT CHARGER SET

(71) Applicant: Andreas Stihl AG & Co. KG, Waiblingen (DE)

(72) Inventors: Michael Fuchs, Waiblingen (DE); Leonard Mattheis, Waiblingen (DE); Benedikt Lang, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 719 days.

(21) Appl. No.: 17/644,257

(22) Filed: Dec. 14, 2021

(65) Prior Publication Data

US 2022/0190612 A1 Jun. 16, 2022

(30) Foreign Application Priority Data

Dec. 15, 2020 (EP) ..................................... 20214324

(51) Int. Cl.
H02J 7/00 (2006.01)
(52) U.S. Cl.
CPC .......... H02J 7/0045 (2013.01); H02J 7/0013 (2013.01); H02J 7/0049 (2020.01)
(58) Field of Classification Search
USPC ........................................................ 320/107
See application file for complete search history.

(56) References Cited

U.S. PATENT DOCUMENTS

| | | | | |
|---|---|---|---|---|
| 4,849,682 A | * | 7/1989 | Bauer | ................. H02J 7/00036 |
| | | | | 320/152 |
| 4,965,738 A | | 10/1990 | Bauer et al. | |
| 5,458,992 A | * | 10/1995 | Bailey | ................. G01R 13/403 |
| | | | | 429/93 |
| 5,874,851 A | * | 2/1999 | Shiota | ................ H03K 19/0027 |
| | | | | 257/E27.06 |
| 6,174,617 B1 | | 1/2001 | Hiratsuka et al. | |
| 7,750,598 B2 | | 7/2010 | Hoffman et al. | |

(Continued)

FOREIGN PATENT DOCUMENTS

| | | |
|---|---|---|
| EP | 2 375 538 A1 | 10/2011 |
| GB | 2 434 264 A | 7/2007 |

(Continued)

OTHER PUBLICATIONS

German-language European Search Report issued in European Application No. 20214324.4 dated May 21, 2021 with partial English translation (10 pages).

*Primary Examiner* — Samuel Berhanu
(74) *Attorney, Agent, or Firm* — Crowell & Moring LLP

(57) ABSTRACT

A multi-port charger has a plurality of charging ports, each configured for removably mounting and electrically charging a rechargeable battery unit, an indicator command unit and a user-activatable command activation unit which is configured to activate the indicator command unit, as well as a corresponding battery multi-port charger set. The indicator command unit is configured to send a charge status indicator command, which commands the battery unit mounted on the respective charging port to indicate its charge status on a battery-side display unit. Use may be for charging battery packs for electric garden and forestry working apparatus.

10 Claims, 3 Drawing Sheets

(56)　　　　　　References Cited

U.S. PATENT DOCUMENTS

| | | | |
|---|---|---|---|
| 2007/0103121 A1* | 5/2007 | Johnson ............. | H01M 50/569 |
| | | | 429/61 |
| 2010/0060232 A1 | 3/2010 | Boyles et al. | |
| 2010/0102777 A1* | 4/2010 | Sa ........................ | G06F 1/1632 |
| | | | 320/115 |
| 2013/0140899 A1* | 6/2013 | Tuukkanen ............ | H02J 9/061 |
| | | | 307/66 |
| 2017/0063114 A1 | 3/2017 | Briere | |
| 2019/0067955 A1* | 2/2019 | Sergyeyenko ........ | H02J 7/0048 |
| 2020/0287398 A1 | 9/2020 | Delose et al. | |

FOREIGN PATENT DOCUMENTS

| | | |
|---|---|---|
| WO | WO 2010/028368 A1 | 3/2010 |
| WO | WO-2017161211 A1 * | 9/2017 |

* cited by examiner

MULTI-PORT CHARGER AND BATTERY PACK MULTI-PORT CHARGER SET

CROSS REFERENCE TO RELATED APPLICATION

This application claims priority under 35 U.S.C. § 119 from European Patent Application No. 20214324.4, filed Dec. 15, 2020, the entire disclosure of which is herein expressly incorporated by reference.

BACKGROUND AND SUMMARY OF THE INVENTION

The invention relates to a multi-port charger having a plurality of charging ports, each configured for removably mounting and electrically charging a rechargeable battery unit, an indicator command unit, and a user-activated command activation unit which is configured to activate the indicator command unit, as well as a corresponding battery multi-port charger set.

The term multi-port charger refers here to a charger which has a plurality of charging ports, at each of which a rechargeable battery unit can be removably mounted for the purpose of electrically charging the same. The term battery unit in this case covers an electrical energy storage device of any conventional battery type, in particular of the type of so-called battery packs, such as are often used for supplying electrical power to, for example, electrically operated garden and forestry working equipment as well as electrically operated DIY equipment or powered hand tools. The battery multi-port charger set in the present case is the complete unit consisting of a multi-port charger and one or more rechargeable battery units which can be electrically charged by means of this multi-port charger.

The command activation unit can be activated by the user, i.e. it is a user-activated command activation unit. Activating it triggers the activation of the indicator command unit, which then executes a corresponding, predefined indicator command function or indicator command action. For example, the command activation unit can be a user-activated control button or another conventional, user-activated control element.

Laid-open publication US 2017/0063114 A1 discloses such a multi-port charger and a corresponding battery multi-port charger set, whereby the multi-port charger there has a tool-case-like housing in which the charging ports are arranged. In addition, the housing accommodates a device-side display unit with one display section per charging port for indicating the charge status of a battery unit arranged in the charging port, and a control unit used for controlling the battery charging operations and for controlling the charge status indicator on the device-side display unit. A user-operated push button allows the user to switch the multi-port charger between a charging mode for performing battery charging and a display mode in which any battery charging operations are interrupted and the battery charging states are detected and displayed.

Patent publication U.S. Pat. No. 7,750,598 B2 discloses a multi-port charger with charging ports, each of which can accommodate a variable number of battery units, and with a device-side display unit having one display section per charging port, wherein both the number and the type of the battery units mounted on the corresponding charging port can be displayed on the respective display section.

It is the technical problem of the invention to provide a multi-port charger of the type mentioned above, which can be implemented with comparatively little effort and, at least for battery units of a specific type, allows a simple indication of their charge status when they are mounted on the respective charging port, as well as to provide a corresponding battery multi-port charger set.

The invention solves this problem by providing an inventive multi-port charger and a multi-port charger set including such multi-port charger. Advantageous refinements of the invention which contribute to the solution of this and other problems are specified in the subclaims, the content of which is hereby incorporated in full by reference to the content of the description.

The multi-port charger according to the invention comprises a plurality of charging ports, each configured for removably mounting and electrically charging a rechargeable battery unit, an indicator command unit, and a user-activated command activation unit which is configured to activate the indicator command unit. The indicator command unit is configured to send a charge status indicator command which commands the battery unit mounted on the respective charging port to indicate its charge status on a battery-side display unit.

The indicator command action carried out by the indicator command unit when activated thus comprises sending the charge status indicator command, which causes one or more battery units mounted on the respective charging port to display their charge status on their battery-side display unit. For example, the charge state indicator command can be sent as a wired electrical command signal or as a wirelessly transmitted command signal, using any conventional type of command signal type and associated types of command signal transmission. As required, the transmitted charge status indicator command may be in particular a short command signal transmitted once only, or a command signal transmitted continuously or repeatedly over a longer period of time, and the display of the charge status on the battery-side display unit can be realized as required, in particular in such a way that, regardless of the duration of the command signal, it persists for a specified period of time or essentially persists for the duration of the command signal.

This measure enables the multi-port charger to easily provide the user with a way to display the charge status of the battery unit mounted on the charging port on the battery-side display unit, assuming the battery unit has such a display unit. Therefore, it is not necessary to equip the multi-port charger itself with a device-side display unit which is able to display the charge states of battery units mounted on the charging ports. Instead, the multi-port charger advantageously makes it possible to use display units present on the battery units to display the battery charge states there. This can save additional effort for implementing such charge status indicator functions in the multi-port charger itself. The charge status can be determined in a conventional manner, e.g. as a battery voltage status by detecting the battery voltage that can be tapped off at the terminals of the battery unit or by recording the electrical charge stored in the battery unit.

The user can use a single activation of the command activation unit to have the charge status of all battery units mounted on the charging ports displayed on their battery-side display units. This means that the user can easily detect by means of the corresponding display request via the command activation unit whether and on which charging port a given battery unit is mounted and what its current charging status is. This retrieval of the charging statuses is preferably also possible when the multi-port charger is in a standby or sleep mode if it has one.

In a refinement of the invention, the multi-port charger is configured to maintain a running battery charging process in an active charging mode when the indicator command unit sends the charge status indicator command. This has the advantage that the battery charging process is not interrupted when the user requests the display of the charge statuses of the battery units mounted on the charging ports. In alternative embodiments, such an interruption of the respective battery charging process is provided in this case, if it is convenient for corresponding applications.

In a refinement of the invention, the multi-port charger comprises a battery status detection unit and a device-side display unit with one display section per charging port. The battery status detection unit is configured to obtain a binary charge capability information which indicates whether a chargeable battery unit is mounted on the respective charging port. The respective display section is configured to receive the charging capability information from the battery status detection unit and to display it. The battery status detection unit is therefore able to detect whether a battery unit is located in the respective charging port and whether it can be charged. The term "rechargeable battery unit" refers in this case to the fact that it is a fault-free battery unit suitable for use in charging in the multi-port charger.

This measure has the advantage that the multi-port charger has a device-side display unit which can be implemented with relatively little effort in such a way that it fulfils the above-mentioned, relatively simple display functionality without necessarily having additional, more complex display functions. Displaying the binary information about the presence of a rechargeable battery unit at the relevant charging port requires only relatively little implementation effort for the device-side display unit. By displaying this information, the user can easily be informed about the charging ports at which battery units that can be charged are located, i.e. those which can be charged in principle, which includes the case that the battery unit is already fully charged. Alternatively, the device-side display unit can be designed to perform more complex display functions. In other alternative embodiments, the multi-port charger remains without such a device-side display unit, which may be unnecessary for corresponding applications.

In a development of the invention, the multi-port charger comprises a fault detection unit which is configured to obtain fault information that indicates a malfunction of the device and/or a malfunction of a battery unit mounted on one of the charging ports. The device-side display unit is configured to receive and display this fault information. This means that the device-side display unit can be advantageously used additionally to indicate the corresponding fault. In alternative embodiments, the device-side display unit remains without such a fault indication function.

In a refinement of the invention, the multi-port charger is configured to carry out battery charging operations sequentially at one of the plurality of charging ports. In this embodiment, therefore, the multi-port charger charges at most one of a possible plurality of battery units to be charged, mounted on the corresponding charging ports, at any given time. Only when the battery charging operation for the respective battery unit has been completed, for example because this battery unit has reached its full state of charge or has been removed from its charging port, does the multi-port charger activate a new battery charging operation for another battery unit at one of the charging ports, if required. This sequential charging operation can simplify the implementation of an associated charging control of the multi-port charger. In alternative embodiments, the multi-port charger can be configured to perform multiple simultaneous battery charging operations at two or more charging ports.

In a refinement of the invention, the indicator command unit comprises an active operating mode which it assumes when activated and in which it sends the charge status indicator command, and a standby operating mode into which it automatically switches from the active operating mode and in which it does not send the charge status indicator command. In this case, the indicator command unit can be in the energy-saving standby operating mode until it is activated by the user to indicate the charge status of a battery unit mounted on the charger, which switches the indicator command unit into the active operating mode to send the charge status indicator command. It can then automatically switch back into the standby mode, e.g. after a specified period of time has elapsed or after the charge status indicator command has been sent.

In a refinement of the invention, the multi-port charger comprises a special power supply for the indicator command unit, this power supply comprising a highest-charge detection unit for detecting a highest-charge battery unit with the highest charge status mounted on the multi-port charger and an assignment unit which assigns the detected highest-charge battery unit to the indicator command unit to supply it with electrical power. This means that the indicator command unit can be supplied with electrical power from the battery unit that has the highest charge status, i.e. is charged the most, among all the battery units currently placed in the multi-port charger.

This ensures a high level of reliability and availability of the function of the indicator command unit, even during periods in which there is no external electricity supply for the multi-port charger, e.g. during periods in which the multi-port charger is not connected to a mains supply via a mains connection cable, and without the charger needing an integrated electrical power supply for the purpose. If required, in corresponding implementations the battery-side display units to which the indicator command unit sends the charge status indicator command can also be supplied by the detected highest-charge battery unit, in order to indicate the charge status of the respective battery unit. This enables, for example, the charge status for a completely discharged battery unit to be indicated without the charger having to be connected to an external electricity supply or to have a built-in power supply. In alternative embodiments, the indicator command unit can be supplied electrically by any one of the mounted battery units to be charged or by a separate supply battery, and/or the battery-side display units are each powered by the respective battery unit.

In a development of the invention the multi-port charger is configured, when in a standby operating mode, to perform a device initialization operation when the command activation unit is activated and to activate its indicator command unit to send the charge status indicator command and activate its display unit to display information about the device initialization operation. For example, by displaying the device initialization operation, the user can be informed of the proper readiness of the multi-port charger when waking it from its standby mode by activating its command activation unit, and by triggering the charge status indicator command the user will be informed by the battery units mounted on the multi-port charger of their charge statuses on their display units. The device initialization process can optionally include activating the previously inactive charging mode of the device, i.e. the command activation unit can also act as a type of on/off switch for the device in this case.

The battery multi-port charger set according to the invention comprises the multi-port charger according to the invention and at least one battery unit that can be mounted on the respective charging port of the multi-port charger and that has a command receiver unit for receiving the charge status indicator command sent by the indicator command unit and a battery-sided display unit that is configured to indicate a charge status of the battery unit. The battery multi-port charger set according to the invention thus advantageously represents a totality of the multi-port charger according to the invention and one or more rechargeable battery units which can be electrically charged by the multi-port charger. The respective battery unit has a command receiver unit for receiving the charge status indicator command sent by the indicator command unit of the multi-port charger and a battery-side display unit, which is configured at least to indicate a charge status of the battery unit. As a result, the user can use the command activation unit of the multi-port charger to cause the respective battery unit to display its current charge status on its display unit. This can eliminate the need for a charge status indicator on the multi-port charger itself.

In a refinement of the invention, the respective battery unit is configured to keep its battery-side display unit inactive for indicating its charge status whenever the battery unit is mounted on one of the charging ports, if it is not currently undergoing a battery charging operation and does not receive the charge status indicator command. This avoids the battery charge status being permanently indicated. Instead, the charge status is indicated selectively at times when this information is particularly useful to the user or is requested by the user. In alternative embodiments a continuous charge status indication can be provided if this is convenient for specific applications.

In a refinement of the invention, the battery unit is a battery pack for supplying electrical power to an electrically operated garden or forestry working apparatus or to an electrically operated hand tool device. In this case, such a battery pack can be electrically charged by means of the multi-port charger according to the invention. Often, such a battery pack already has a built-in, battery-side display unit which can then be used to indicate the charge status at the user's request.

Advantageous embodiments of the invention are shown in the drawings. These and other embodiments of the invention are described in more detail below.

DETAILED DESCRIPTION OF THE DRAWINGS

As illustrated in the figures based on an exemplary embodiment, the multi-port charger according to the invention comprises a plurality of charging ports, in the example shown four charging ports $L_1$, $L_2$, $L_3$, $L_4$, in other embodiments not shown, only two or three or any number more than four charging slots, an indicator command unit 1 and a user-activatable or user-activated command activation unit 2. Each charging port $L_1$ to $L_4$ is configured for the removable mounting and electric charging of a rechargeable battery unit. The complete unit consisting of a multi-port charger 3 and one or more rechargeable battery units, which can be electrically charged with the multi-port charger 3, forms a corresponding battery multi-port charger set. The figures show examples of four battery units $B_1$, $B_2$, $B_3$, $B_4$. As shown in the figures, the battery units $B_1$ to $B_4$ can be, for example, in each case a battery pack $A_1$, $A_2$, $A_3$, $A_4$ for supplying electrical power to an electrically operated garden or forestry working apparatus, or an electrically operated handheld tool or DIY (Do-It-Yourself) tool.

Figures 1, 2:
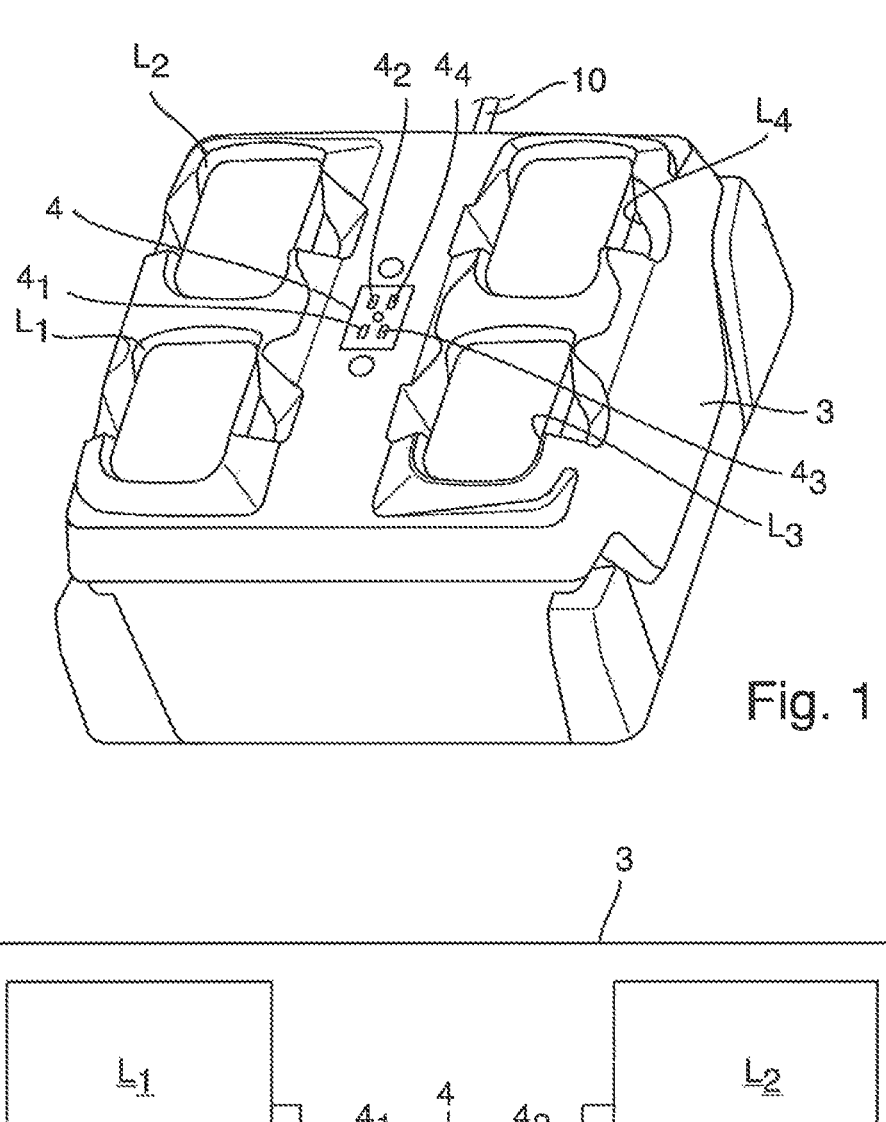
FIG. 1 shows a perspective view of a multi-port charger with four charging ports and battery units mounted therein.
FIG. 2 shows a block diagram representation of the multi-port charger of FIG. 1 without mounted battery units.

The command activation unit 2 is configured to activate the indicator command unit 1. The user can activate the indicator command unit 1 accordingly by activating the command activation unit 2. For example, the command activation unit 2 can include a push button, as illustrated in the example of FIG. 1, or another conventional control as a user interface that the user can use to trigger the activation of the indicator command unit 1.

The indicator command unit 1 is configured to send a charge status indicator command $B_A$, which commands the battery unit $B_1$ to $B_4$ mounted on the respective charging port $L_1$ to $L_4$ to display its charge status on a battery-side display unit 7. For this purpose, the respective battery unit $B_1$ to $B_4$ comprises a command receiver unit 6 for receiving the charge status indicator command $B_A$ sent by the indicator command unit 1, and the battery-side display unit 7 which is configured to display the charge status of the battery unit $B_1$ to $B_4$. The battery-side display unit 7 of the respective battery unit $B_1$ to $B_4$ can be of any conventional type known to the person skilled in the art in the field of rechargeable battery units. In particular, the battery-side display unit 7, as in the example shown, can include an optical display section, e.g. a conventional LED (light-emitting diode) display section. In the example shown, the battery-side display units 7 each comprise a four-level display section with four optical display elements, e.g. LED display elements, which indicate the charge status, for example, in relation to the battery voltage delivered by the relevant battery unit.

The charge status indicator command $B_A$ may, as required, have any conventional command signal shape known to the person skilled in the art, e.g. in the form of a single signal pulse or a signal that is continuous throughout a specified period of time, or a periodic signal. Depending on the requirements and the use case, the charge status indicator command $B_A$ can be transmitted by wired or wireless means, for example as an electrical or electromagnetic or optical signal, wherein the indicator command unit 1 and the respective command receiver unit 6 are designed for this purpose, in a manner known to the person skilled in the art, which therefore does not require any further explanation here.

Figure 3:
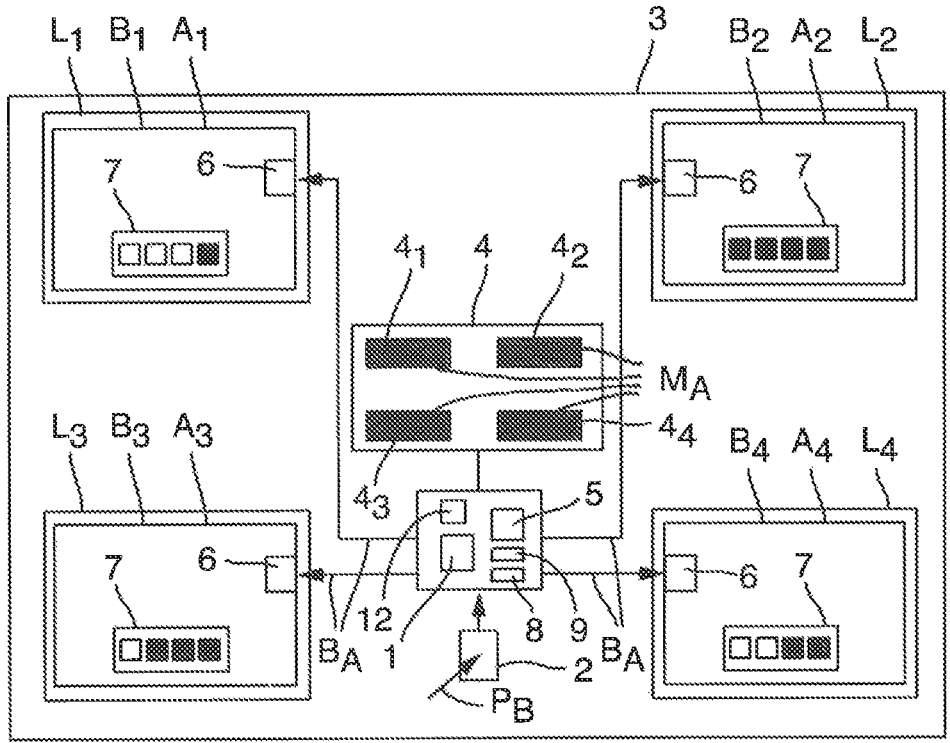
FIG. 3 shows the block diagram representation of FIG. 2 with four mounted battery units during a charge status query in a charge-inactive device operating state.
Figure 5:
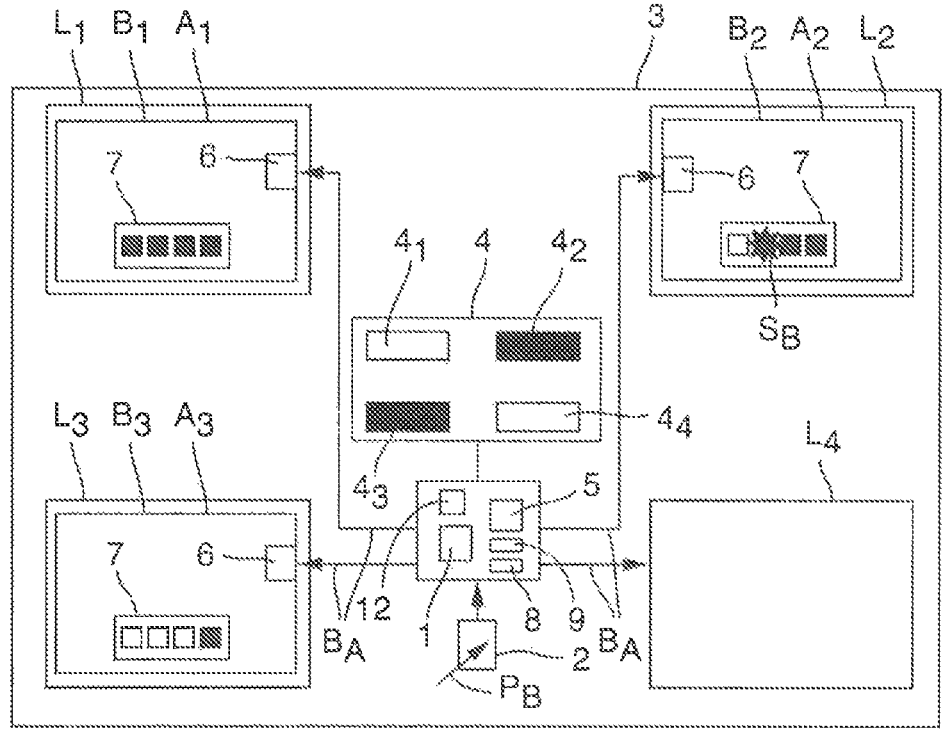
FIG. 5 shows the block diagram representation of FIG. 4 in the charge-active device operating state with an additional charge status query.

In FIGS. 3 and 5, the transmission of the charge status indicator command $B_A$ by the indicator command unit 1 to the command receiver units 6 of the battery units $B_1$ to $B_4$ is illustrated in one corresponding operating situation of the multi-port charger 3 each, wherein the user activation of the command activation unit 2 is represented by an activating arrow $P_B$ pointing to the command activation unit 2. Specifically, the multi-port charger 3 in FIG. 3 is in a charge-inactive operating mode, e.g. because it is disconnected from a power supply, and in FIG. 5 is in an active charging mode.

In corresponding embodiments, the multi-port charger 3, as in the example shown, is configured to maintain a running battery charging operation in the active charging mode when the indicator command unit 1 sends the charge status indicator command $B_A$. This means that the user-requested indication of the charging state(s) of the one or more battery units currently mounted on the multi-port charger 3 can be performed without interrupting the active charging of one or more of these battery units by the multi-port charger 3.

Figure 4:
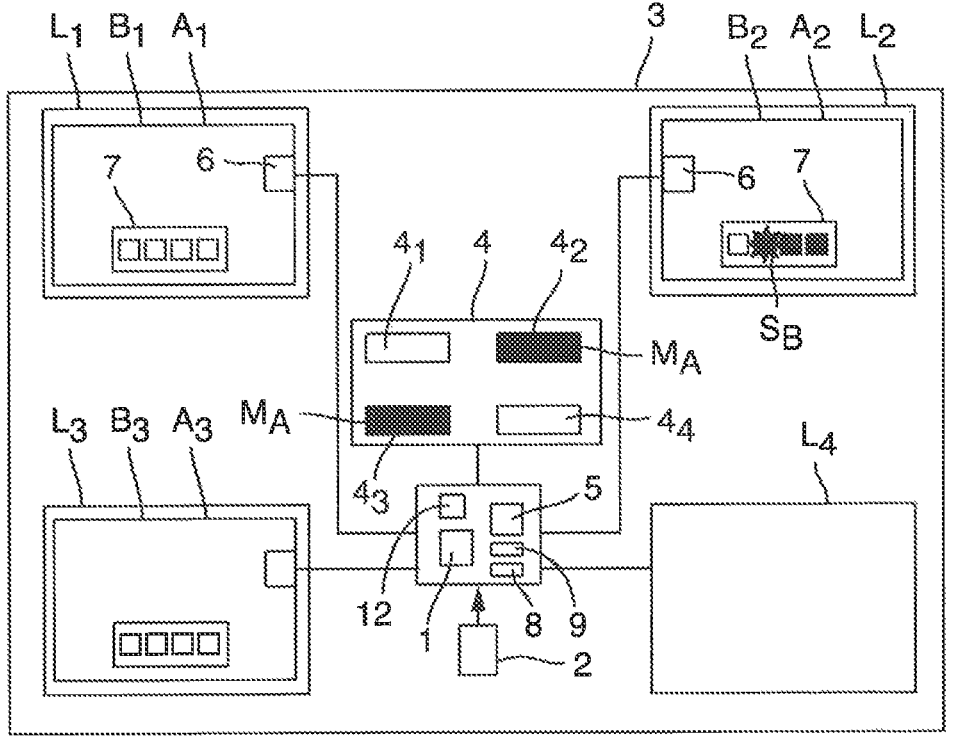
FIG. 4 shows the block diagram representation of FIG. 2 with three mounted battery units in a charge-active device operating state.

This is illustrated in concrete examples in FIGS. 4 and 5, wherein in this example situation shown an optical flashing signal $S_B$ emitted by the respective battery-side display unit 7 indicates that the relevant battery unit, in this case the battery unit $B_2$, is currently being charged. Starting from this active device operating mode, i.e. active charging mode, with the battery unit $B_2$ currently being charged according to FIG. 4, FIG. 5 illustrates the user-requested indication of the charging states of the battery units currently mounted on the multi-port charger 3, in this case the battery units $B_1$, $B_2$ and $B_3$, on their display units 7. The flashing signal $S_B$, which remains activated according to FIG. 5, indicates that the active charging operation for the battery unit $B_2$ is maintained without interruption even during this user-requested charge status indication.

In corresponding embodiments, the multi-port charger 3 is configured, as in the example shown, for the sequential execution of battery charging operations at one of the plurality of charging ports $L_1$ to $L_4$ at a time. In the operating states of FIGS. 4 and 5, the multi-port charger 3 is charging the second battery unit $B_2$, as indicated by the flashing signal $S_B$. Other battery units possibly mounted on the multi-port charger 3, in the operating situations of FIGS. 4 and 5 the battery units $B_1$ and $B_3$, are already fully charged or are waiting for their charging operation, which can begin after the charging operation for the second battery unit $B_2$ has been completed.

For example, the multi-port charger 3 can be designed in such a way that after the operation is started, e.g. initiated by connection to a power supply, it first queries the first charging port $L_1$ for the presence of a chargeable battery unit $B_1$ and if the answer is affirmative charges this battery unit $B_1$ until it reaches its full charge status, assuming it is not yet fully charged, i.e. has not yet reached its maximum battery voltage or its maximum amount of charge that can be stored, in order then to proceed successively with the other charging ports $L_2$, $L_3$ and $L_4$ accordingly. In alternative embodiments, the multi-port charger 3 is designed for charging a plurality of mounted battery units simultaneously.

In advantageous embodiments, the indicator command unit 1, and preferably the multi-port charger 3 as a whole, has an active operating mode and a standby operating mode, as realized in the example shown. The active operating mode is assumed by the indicator command unit 1 when it is activated by user activation of the command activation unit 2, and it then sends the charge status indicator command $B_A$. After sending the charge status indicator command $B_A$ the indicator command unit 1 automatically returns from the active operating mode to the standby operating mode, e.g. after a certain period of time has elapsed, wherein it remains inactive in the standby operating mode and, in particular, does not send the charge status indicator command $B_A$. The multi-port charger 3 can be in the standby operating mode in particular when it is not connected to a power supply.

In advantageous embodiments, the multi-port charger 3, as in the example shown, contains a battery status detection unit 5 which is configured to obtain a binary charge capability information indicating whether a chargeable battery unit is mounted on the respective charging port $L_1$, $L_2$, . . . , and a device-side display unit 4 with one display section $4_1$, $4_2$, . . . per charging port $L_1$, $L_2$, . . . . In the example shown, the device-side display unit 4 is an optical display unit with one optical display section $4_1$ to $4_4$ per charging port $L_1$ to $L_4$, alternatively or additionally the display unit 4 can contain an acoustic display section, for example. The respective display section $4_1$ to $4_4$ is configured to receive the charging capability information obtained from the battery status detection unit 5 and to display it as binary display information $M_A$. For the battery status detection unit 5, any conventional realization known to the person skilled in the art for this purpose can be used, for which it is designed to be capable of detecting whether there is a battery unit at the relevant charging port $L_1$ to $L_4$ at all, and, if so, whether this is chargeable, i.e. whether it is a battery unit that is in principle suitable for charging by the multi-port charger 3 and which is in a correct, fault-free state. The binary display information $M_A$ therefore essentially indicates whether a chargeable battery unit is mounted on the associated charging port $L_1$ to $L_4$. The multi-port charger 3 performs this function with its battery status detection unit 5 and its display unit 4, in particular during an initialization process when it is transferred from its standby operating mode to its active charging mode, e.g. by being connected to an electricity supply or voltage supply.

This display functionality is illustrated in various operating situations in FIGS. 3, 4 and 5, wherein in this example the respective display section $4_1$ to $4_4$ is formed by an LED display element and the binary display information $M_A$ takes the form of the respective LED display element being lit, represented in the figures as a black box, or not lit, represented in the figures by a white box. In the operating situations of FIGS. 4 and 5, there is no battery unit in the charging port $L_4$, which is why the associated display section $4_4$ is not lit. Furthermore, for the operating situations of FIGS. 4 and 5 it is assumed that the device 3, after starting its active charging mode as part of a sequential processing, has first queried the first charging port $L_1$ and fully charged the battery unit $B_1$ there as required and then proceeded to the second charging port $L_2$. In the example shown, it is provided that the initial binary display information $M_A$ is extinguished again when the relevant battery unit, in the case of FIGS. 4 and 5 the battery unit $B_1$, is fully charged. Consequently, the associated display section $4_1$ does not light up in FIGS. 4 and 5. The battery unit $B_2$ mounted on the charging port $L_2$ is currently being charged, as explained above, which means that it is not yet fully charged and therefore the associated display section $4_2$ lights up, i.e. the binary display information $M_A$ which it outputs indicates that a chargeable battery unit $B_2$, which is not yet detected as being fully charged during the current charging operation of the device 3, is mounted on the associated charging port $L_2$. The same applies to the display section $4_3$, which is assigned to the charging port $L_3$ and is also lit in the operating situations of FIGS. 4 and 5 to indicate that there is a rechargeable battery unit $B_3$ there which is still waiting to be processed by the sequentially operating device 3.

In corresponding implementations, the device-side display unit 4, as in the example shown, is also kept essentially inactive during the standby operating mode of the multi-port charger 3, however, in the event of a charge status query it is also activated when the charging mode of the device 3 remains inactive. Accordingly, the display sections $4_1$ to $4_4$ are activated in the relevant operating situation according to FIG. 3, in which the multi-port charger 3 is in the charge-inactive operating mode, if in response to a user request the charge status of the battery units $B_1$ to $B_4$ or $B_1$ to $B_3$ currently mounted on the multi-port charger 3 is queried and displayed on their battery-side display units 7.

Specifically, FIG. 3 illustrates an example of an operating situation in which all charging ports $L_1$ to $L_4$ are occupied by a respective battery unit $B_1$ to $B_4$ and the multi-port charger 3 is initially in a standby mode or sleep mode, for example because it is currently not connected to an external voltage supply or electricity supply via a mains connection cable 10 indicated in FIG. 1, or a corresponding external power supply is switched off, e.g. via an associated off switch or standby switch. In this standby or sleep mode, the device-side display unit 4 normally remains inactive.

Starting from this situation, as soon as the user activates the command activation unit 2, thereby triggering a device initialization which activates the indicator command unit 1 to send the charge status command $B_A$, this commands the battery units $B_1$ to $B_4$ that are mounted on the charging ports $L_1$ to $L_4$ to indicate their charge status on their battery-side display units 7. For this purpose, the command receiver units 6 of the battery units $B_1$ to $B_4$ that are mounted on the charging ports $L_1$ to $L_4$ receive the charge status indicator command $B_A$ and initiate a corresponding detection and indication of the current charge status of the relevant battery unit $B_1$ to $B_4$ on their battery-side display units 7.

In advantageous implementations, as in the example shown, the device initialization by the user-triggered charge status request simultaneously causes the battery status detection unit 5 to query the charging ports $L_1$, $L_2$, ... with regard to the presence of chargeable battery units and to display the associated binary display information $M_A$ in each case on the display sections $4_1$, $4_2$, ... of the device-side display unit 4. Since in the case of FIG. 3 it is assumed that a chargeable battery unit $B_1$ to $B_4$ is located in all charging ports $L_1$ to $L_4$, all four associated LED display elements of the display sections $4_1$ to $4_4$ will light up.

FIG. 3 illustrates the case in which the battery unit $B_1$ on the charging port $L_1$ is only charged to a relatively low level, for which a first of the four display elements of its display unit 7 is lit, symbolized in the figures as a black box, while the remaining three display elements are not lit, symbolized in the figures as a white box. If the charge status is detected from the battery voltage, as mentioned above, this may correspond, for example, to a charge status in which the battery voltage of the battery unit $B_1$ has reached a value of 20% of the maximum voltage. The battery voltage of battery unit $B_4$ in the charging port $L_4$ has reached a value of 40% of the maximum voltage, for which the first and a second of the four display elements of its display unit 7 light up but the other two do not. The battery unit $B_3$ on the charging port $L_3$ has reached a value of 60% of the maximum voltage, for which a third of the four display elements of its display unit 7 additionally lights up and only a fourth, final display element does not light up. Battery voltage of the battery unit $B_2$ on the charging port $L_2$ has reached a value of 80% of the maximum voltage, for which all four display elements of its display unit 7 are lit up.

Preferably, the display information on the display units 7 and on the display unit 4 is temporarily maintained for a predetermined period of time, after which the device 3 returns to its standby operating mode and the battery-side display units 7 and the device-side display unit 4 are deactivated again.

In advantageous embodiments, the battery units $B_1$ to $B_4$, as shown in the example, are configured to keep their battery-side display unit 7 for indicating their charge status inactive when the battery unit $B_1$ to $B_4$ is mounted on one of the charging ports $L_1$ to $L_4$ but there is no battery charging in progress, i.e. it is not currently charging, and it also does not receive the charge status indicator command $B_A$. Therefore, in the operating situation of FIG. 4 the display elements of the display units 7 of the battery units $B_1$ and $B_3$, which are not currently being charged, do not light up. This avoids unnecessary permanent display of the battery charging states and the associated energy consumption. Instead, the user can specifically request that the battery charge states be indicated by activating the command activation unit 2. Since the battery charge states are indicated on the battery-side display units 7, it is not mandatory to equip the multi-port charger 3 with a display unit that allows the charge states of the battery units currently mounted on the charging ports $L_1$ to $L_4$ to be displayed, preferably at the same time. Instead, the battery-side display units 7, which are already present on the battery units $B_1$ to $B_4$ for this display purpose, are used for this purpose.

In the operating situation of FIG. 5, the operating situation according to FIG. 4 is specifically assumed, in which the multi-port charger 3 is in the active charging mode, wherein at the instant shown the battery unit $B_2$ on the charging port $L_2$ is currently being charged. As the battery unit $B_2$ is thus currently in active charging mode, in accordance with FIG. 4 it also indicates its active charge status on its display unit 7, even without receiving the charge status indicator command $B_A$. As an example, it is assumed that its battery voltage is between 60% and 80% of the maximum voltage, for which three of the four display elements of the display unit 7 are lit and one is not. In addition, the last illuminated display element of the multi-level display section of the display unit 7 is activated in a flashing mode, i.e. it outputs the flashing signal $S_B$, which indicates that the relevant battery unit, in the operating situation of FIG. 4 the battery unit $B_2$, is currently being charged. The battery units $B_1$, $B_3$, which in the operating situation of FIG. 4 are additionally mounted on the charging ports $L_1$ and $L_3$, keep their respective associated display units 7 inactive, as already mentioned above, because they are not currently being charged and also do not receive the charge status indicator command $B_A$.

As soon as the user then initiates the indicator command unit 1 according to FIG. 5 to send the charge status indicator command $B_A$, the display of the charge states in the battery units $B_1$ to $B_3$ mounted on the charging ports $L_1$ to $L_3$ is triggered after receiving the charge status indicator command $B_A$ via their command receiver units 6. As mentioned above, this occurs without interruption of the charging operation for battery unit $B_2$. Since the battery unit $B_2$ is already indicating its charge status during its charging process, the charge status indication for this battery unit $B_2$ does not change. In addition, in response to this user query, however, the battery units $B_1$ and $B_3$ at the charging ports $L_1$ and $L_3$ now also indicate their respective charge states via their associated display units 7. The example in FIG. 5 considers the case in which the battery unit $B_1$ is fully charged or at least charged to such an extent that its battery voltage is above 80% of the maximum voltage, for which all four display elements of its display unit 7 are lit, and in which the battery voltage of battery unit $B_3$ is only between 20% and 40% of the maximum voltage, for which one of the four display elements of its display unit 7 is lit.

In advantageous embodiments, the multi-port charger 3, as in the example shown, comprises a power supply for the indicator command unit 1 that has a highest-charge detection unit 8 and an assignment unit 9. The highest-charge detection unit 8 is configured to detect a highest-charge battery unit with the highest charge status mounted in the multi-port charger 3, wherein in this case the highest-charge battery unit is understood to mean the battery unit of all the battery units currently located on the charging ports $L_1$ to $L_4$ of the multi-port charger 3 that is charged the most, i.e. has the highest level of charge. Depending on the nature of the charge status detection, the highest charge status does not necessarily relate to the battery unit with the most stored electrical charge, but it can also mean the battery unit with the highest battery voltage. This does not necessarily have to correspond with the highest quantity of charge, for example due to different battery capacities or battery ageing effects. The assignment unit 9 is designed to assign the detected highest-charge battery unit to the indicator command unit 1 for supplying it with electrical energy, i.e. the assignment unit 9 ensures that the electrical energy required to operate the indicator command unit 1 is extracted from the battery unit which has the highest charge state or the highest battery voltage of all the battery units currently mounted on the charging ports $L_1$ to $L_4$. This ensures that the indicator command unit 1 is reliably supplied with the required electrical energy, in particular during periods in which the multi-port charger 3 is not connected to an external power supply and therefore no external electrical energy is available for its operation.

In corresponding implementations, as in the example shown, a fault detection unit 12 is provided that is configured to obtain fault information indicating a malfunction of the device and/or a malfunction of a battery unit mounted on one of the charging ports $L_1$, $L_2$, . . . . In this case, the device-side display unit 4 is configured to receive and display the fault information. This means that the device-side display unit 4 can be advantageously used in addition to provide a fault indication functionality.

The fault detection unit 5 can be of any conventional type known to the person skilled in the art, which depends, among other things, on which faults it will be used to detect in order to indicate them. In corresponding implementations, multiple fault types can be discriminated on the device-side display unit 4, i.e. indicated such that they are distinguishable from one another, e.g. by different light activation patterns of the four display sections $4_1$ to $4_4$ and/or by different light activation of the respective display section $4_1$ to $4_4$. For example, a first fault could be indicated by flashing all four display sections $4_1$ to $4_4$, a second fault by flashing only one of the four display sections $4_1$ to $4_4$, a third fault by flashing another of the four display sections $4_1$ to $4_4$, or by flashing the same display section with a different flashing rhythm, etc.

It should be mentioned here that in corresponding embodiments the respective display section $4_1$ to $4_4$ of the device-side display unit 4 and/or the respective display section of the battery-side display unit 7 can have more than two possible active illumination states, e.g. two active illumination states of different colours. This can be advantageous for certain applications, e.g. the use of red illumination states to display information about faulty or critical operating states, and green illumination states for various displays during normal, proper operation of the device 3 or the battery units mounted in it.

In corresponding embodiments the multi-port charger 3 is configured, as in the example shown, to perform a device initialization operation if the command activation unit 2 is activated when the charger is in a standby operating mode, and to activate its indicator command unit 1 to send the charge status indicator command $B_A$ and activate its display unit 4 to display information about the device initialization operation. It goes without saying that this information about the device initialization process is again displayed in a way that is distinguishable from the indications of other information such as the fault information mentioned, e.g. by a specific flashing sequence of all four display sections $4_1$ to $4_4$. By displaying the device initialization process, the user can be informed, for example, of whether the device 3 and all its components are in a fault-free state of operational readiness. The device initialization process can also be used, if necessary, to transfer the device 3 from its charge-inactive standby mode into its active charging operating mode, i.e. to switch on the device 3 to start the charging mode for the mounted battery units $B_1$ to $B_4$. By triggering the charge status indicator command, the user is informed of the charge status of the battery units $B_1$ to $B_4$ mounted in the multi-port charger 3 on their display units 7. Optionally, the device initialization process can be performed even if the multi-port charger 3 is connected to a power supply by its power cable 10 being plugged in and/or if a battery unit is inserted into an empty charging port.

In advantageous embodiments, as in the example shown, the indicator command unit 1 is part of a control unit 11 with which the multi-port charger 3 can be equipped and which is configured to perform the required charger control functions.

The control unit 11 can be implemented on the basis of any conventional charger control unit in which the above-mentioned charger control functions are additionally implemented, as will be understood by the person skilled in the art by virtue of knowing these functions. The control unit 11 preferably also comprises the battery status detection unit 5, the highest-charge detection unit 8, the assignment unit 9, and the fault detection unit 12, provided these components are present in the relevant charger embodiment.

All components of the control unit 11 can be designed in hardware and/or software as required, as is known to the person skilled in the art. In particular, the control unit 11 also includes standard interface components for wireless or wired data/signal communication, in particular with the battery-side command receiver units 6 and any other communication interfaces of the battery units $B_1$ to $B_4$ or the charging ports $L_1$ to $L_4$ and optionally also with external communication interfaces outside the multi-port charger 3, for example, for communication between the multi-port charger 3 and external computers, smartphones or the like. The command activation unit 2 can also be designed as a communication interface of the control unit 11, via which the user can trigger the activation of the indicator command unit 1 by mechanical contact or wirelessly via a smartphone, or otherwise.

As the examples shown and the other examples explained above make clear, the invention provides in a very advantageous way a multi-port charger and a corresponding battery multi-port charger set, which enable the charging states of battery units mounted on the charging ports of the multi-port charger to be indicated on the battery-side display units of the battery units upon user request, without the need for a device-side display unit and without the need for the battery units to permanently display their charge states, and without the user having to perform appropriate activation operations on the individual battery units.

The multi-port charger can be used in particular to electrically charge battery packs of electrically operated garden or forestry working equipment or for electrically operated hand-held tools or DIY equipment, and in suitable embodiments of the multi-port charger any other rechargeable battery units.

What is claimed is:

1. A multi-port charger, comprising:

a plurality of charging ports, each of which is configured for removably mounting and electrically charging a rechargeable battery unit;

an indicator command unit;

a power supply for the indicator command unit; and a user-activatable command activation unit configured to activate the indicator command unit, wherein the indicator command unit is configured to send a charge status indicator command receivable by a command receiver unit of the rechargeable battery, which commands the rechargeable battery unit mounted on the respective charging port to indicate its charge status on a battery-side display unit provided on the rechargeable battery unit so as to be visible for a user from outside the rechargeable battery unit, while mounted on the respective charging port, without disassembly, and the power supply comprises a highest-charge detection unit for detecting a highest-charge battery unit having the highest charge status mounted on the multi-port charger, and an assignment unit which assigns the detected highest-charge battery unit to the indicator command unit to supply it with electrical power.

2. The multi-port charger according to claim 1, wherein the charger is configured to maintain, in an active charging mode, a running battery charging process when the indicator command unit sends the charge status indicator command.

3. The multi-port charger according to claim 1, further comprising:

a battery status detection unit which is configured to obtain a binary charge capability information that indicates whether the rechargeable battery unit is mounted on the respective charging port; and a device-sided display unit having one display section per charging port, wherein the respective display section is configured to receive the charge capability information from the battery status detection unit and display the same.

4. The multi-port charger according to claim 3, wherein a fault detection unit is provided, configured for obtaining fault information indicating a device-side malfunction and/or a malfunction of the rechargeable battery unit mounted on one of the charging ports, and the device-side display unit is configured to receive and display the fault information.

5. The multi-port charger according to claim 1, wherein the charger is configured for sequentially carrying out battery charging operations on each one of the plurality of charging ports.

6. The multi-port charger according to claim 1, wherein the indicator command unit has an active operating mode which it assumes when activated and in which it sends the charge status indicator command, and a standby operating mode into which it automatically switches from the active operating mode and in which it does not send the charge status indicator command.

7. The multi-port charger according to claim 3, wherein the charger is configured, when in a standby operating mode, to perform a device initialization operation when the command activation unit is activated and to activate its indicator command unit to send the charge status indicator command and activate its display unit to display information about the device initialization operation.

8. A battery multi-port charger set, comprising:

a multi-port charger; and at least one rechargeable battery unit which is capable of being mounted on one of a plurality of charging ports of the multi-port charger for electrically charging, and which comprises a command receiver unit for receiving a charge status indicator command sent by an indicator command unit, and a battery-side display unit which is configured to indicate a charge status of the at least one rechargeable battery unit, wherein the multi-port charger comprises the plurality of charging ports, each of which is configured for removably mounting and electrically charging a rechargeable battery unit, the indicator command unit, a power supply for the indicator command unit, and a user-activatable command activation unit configured to activate the indicator command unit, wherein the indicator command unit is configured to send the charge status indicator command, which commands the at least one rechargeable battery unit mounted on the respective charging port to indicate its charge status on the battery-side display unit provided on the at least one rechargeable battery unit so as to be visible for a user from outside the rechargeable battery unit, while mounted on the respective charging port, without disassembly, and wherein the power supply comprises a highest-charge detection unit for detecting a highest-charge battery unit having the highest charge status mounted on the multi-port charger, and an assignment unit which assigns the detected highest-charge battery unit to the indicator command unit to supply it with electrical power.

9. The battery multi-port charger set according to claim 8, wherein the at least one rechargeable battery unit is configured to keep its battery-side display unit for indicating its charge status inactive whenever the at least one battery unit is mounted on one of the charging ports, if it is not currently undergoing a battery charging process and does not receive the charge status indicator command.

10. The battery multi-port charger set according to claim 8, wherein the at least one rechargeable battery unit is a battery pack for supplying electrical power to an electrically operated garden or forestry working apparatus or an electrically operated hand tool apparatus.

* * * * *